(12) United States Patent
Jeong (10) Patent No.: US 9,126,566 B2
(45) Date of Patent: Sep. 8, 2015

(54) AIRBAG MODULE FOR VEHICLE

(71) Applicant: HYUNDAI MOBIS Co., Ltd., Yongin-si, Gyeonggi-do (KR)

(72) Inventor: Hun Hee Jeong, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/335,997

(22) Filed: Jul. 21, 2014

(65) Prior Publication Data

US 2015/0144413 A1 May 28, 2015

(30) Foreign Application Priority Data

Nov. 26, 2013 (KR) .................. 10-2013-0144802

(51) Int. Cl.
*B60R 21/36* (2011.01)
*B60R 21/2346* (2011.01)

(52) U.S. Cl.
CPC ............. *B60R 21/36* (2013.01); *B60R 21/2346* (2013.01)

(58) Field of Classification Search
CPC ............... B60R 21/36; B60R 2021/23324; B60R 21/261; B60R 2021/2615
USPC ......... 180/274; 280/730.1, 730.2, 743.2, 740; 296/187.04
See application file for complete search history.

(56) References Cited

U.S. PATENT DOCUMENTS

| | | | |
|---|---|---|---|
| 6,676,158 B2 * | 1/2004 | Ishikawa ............... | 280/743.1 |
| 6,712,169 B2 * | 3/2004 | Ryan et al. ............. | 180/274 |
| 6,908,578 B2 * | 6/2005 | Schumacher et al. ... | 264/45.8 |
| 7,021,652 B2 * | 4/2006 | Kumagai et al. ......... | 280/729 |
| 7,134,691 B2 * | 11/2006 | Dunkle et al. ............ | 280/743.2 |
| 7,584,988 B2 * | 9/2009 | Okamoto et al. ......... | 280/730.1 |
| 7,597,348 B2 * | 10/2009 | Fukuda et al. ............ | 280/730.2 |
| 7,926,838 B2 * | 4/2011 | Honda et al. ............. | 280/729 |
| 8,016,066 B1 * | 9/2011 | Boxey ..................... | 180/271 |
| 2002/0074775 A1 * | 6/2002 | Ryan ....................... | 280/728.2 |
| 2006/0049618 A1 * | 3/2006 | Bito ......................... | 280/732 |
| 2007/0023223 A1 * | 2/2007 | Okamoto et al. ......... | 180/274 |
| 2009/0014988 A1 * | 1/2009 | Takimoto et al. ......... | 280/730.1 |
| 2009/0120708 A1 * | 5/2009 | Takimoto ................. | 180/274 |
| 2009/0200778 A1 * | 8/2009 | Ishikawa et al. ......... | 280/739 |
| 2011/0298200 A1 * | 12/2011 | Taniguchi et al. ........ | 280/736 |
| 2011/0298201 A1 * | 12/2011 | Kobayashi et al. ....... | 280/736 |

FOREIGN PATENT DOCUMENTS

| | | |
|---|---|---|
| JP | 2002-308028 | 10/2002 |
| JP | 3591367 | 9/2004 |
| JP | 4010483 | 9/2007 |
| JP | 4621119 | 11/2010 |
| KR | 20-0431748 | 11/2006 |
| KR | 10-2013-0048866 A | 5/2013 |

* cited by examiner

*Primary Examiner* — Paul N Dickson
*Assistant Examiner* — Darlene P Condra
(74) *Attorney, Agent, or Firm* — Sherr & Jiang, PLLC (57) ABSTRACT

An airbag module for a vehicle according to the present invention includes: an inflator; and an airbag cushion which is deployed by high pressure gas discharged from the inflator, in which a dead zone, which allows the high pressure gas discharged from the inflator to branch off and flow through at least two branch flow paths, is formed in the airbag cushion, and a variable tether, which guides the high pressure gas passing through the at least two branch flow paths to the upper side of the airbag cushion and has a plurality of vent holes that is opened so that upper and lower portions of the airbag cushion communicate with each other when internal pressure of the airbag cushion exceeds a preset value, is installed in the airbag cushion, such that the high pressure gas is quickly and uniformly distributed and supplied into the airbag cushion.

19 Claims, 10 Drawing Sheets

AIRBAG MODULE FOR VEHICLE

CROSS REFERENCE TO PRIOR APPLICATIONS

The present application claims priority under 35 U.S.C. §119 to Korean Patent Application No. 10-2013-0144802 (filed on Nov. 26, 2013), which is hereby incorporated by reference in its entirety.

TECHNICAL FIELD

The present invention relates to an airbag module for a vehicle, and more particularly, to an airbag module for a vehicle for protecting a pedestrian, which allows high pressure gas to be quickly and uniformly supplied to ends of an airbag cushion for a vehicle, thereby improving an effect of protecting a pedestrian at the time of a vehicle-pedestrian collision accident.

BACKGROUND

In general, various types of airbag modules such as an airbag for protecting a driver, and an airbag for protecting a passenger seated on a front passenger seat are mounted in a vehicle.

Among others, an airbag device for protecting a pedestrian is configured so that an inflator is mounted on a cowl top panel or a hood panel, and an airbag cushion is deployed toward a wind shield glass by an operation of the inflator, thereby protecting a head or an upper body of a pedestrian who collides with the vehicle, and thereafter, secondarily collides with the wind shield glass.

In this case, since the inflator is mounted on the cowl top panel or the hood panel, the inflator is horizontally installed in a left and right direction of a vehicle body. In addition, in most instances, a single inflator is installed at a central portion on the basis of the wind shield glass, and a discharge portion for discharging high pressure gas is formed at the inflator in only one direction.

Meanwhile, when the airbag cushion is deployed, the airbag cushion covers a lower end portion of the wind shield glass on the basis of the wind shield glass, and left and right upper portions of the airbag cushion are deployed to form an approximate "U" shape so as to cover left and right portions of the wind shield glass in order to protect the driver and the passenger seated on the front passenger seat.

However, since the inflator has the discharge portion for discharging high pressure gas which is formed in only one direction, as described above, there is a problem in that the high pressure gas eccentrically discharged to one side cannot be uniformly distributed to the left and right upper portions of the airbag cushion.

Korean Patent Application Laid-Open No. 10-2013-0048866 and Korean Utility Model Registration No. 20-0431748 disclose technical solutions for uniformly distributing high pressure gas discharged from a high pressure gas discharge portion of an inflator to ends of the airbag cushion.

In more detail, Korean Patent Application Laid-Open No. 10-2013-0048866 partitions an internal space into a plurality of divided chambers, and includes a diffuser pocket in which an inlet through which the high pressure gas is supplied from the inflator, and a plurality of gas discharge portions through which the high pressure gas is discharged to the divided chambers are integrally provided in a main cushion, in order to maintain internal pressure in the main cushion to be overall uniform.

Korean Utility Model Registration No. 20-0431748 relates to a side airbag module, the airbag module is provided in the vicinity of a gas discharge portion of the inflator, and formed in a pocket shape for dispersing the discharged gas, and includes a diffuser pocket having a diffuser discharge port that is opened upward, thereby achieving the uniform deployment of the airbag cushion.

However, since the divided chambers and the diffuser pocket in the related art need to be formed in the airbag cushion, there are problems in that a weight and costs of the airbag module are increased, it is difficult to uniformly distribute the high pressure gas into the airbag cushion because the high pressure gas is eccentrically disposed to one side from the gas discharge portion of the inflator, a reinforcing fabric is required to absorb high temperature heat and high pressure of the high pressure gas, and the supply of the high pressure gas to the upper portions of the airbag is impeded.

SUMMARY

The present invention has been made in an effort to provide an airbag module for a vehicle, which reduces an overall weight of the airbag module, reduces production costs, and allows high pressure gas to be uniformly and quickly supplied into an airbag cushion, thereby improving an effect of protecting a pedestrian.

An exemplary embodiment of the present invention provides an airbag module for a vehicle, including: an inflator; and an airbag cushion which is deployed by high pressure gas discharged from the inflator, in which a dead zone, which allows the high pressure gas discharged from the inflator to branch off and flow through at least two branch flow paths, is formed in the airbag cushion.

A variable tether, which guides the high pressure gas passing through the at least two branch flow paths to the upper side of the airbag cushion and has a plurality of vent holes that is opened so that upper and lower portions of the airbag cushion communicate with each other when internal pressure of the airbag cushion exceeds a preset value, may be installed in the airbag cushion.

The inflator may be disposed below a front side of a wind shield glass, and the airbag cushion may be deployed toward the front side of the wind shield glass, and deployed so that both end portions thereof protrude upward.

The dead zone may be formed by joining and sewing a predetermined portion of an inner surface of a front panel of the airbag cushion to a predetermined portion of an inner surface of a rear panel.

A gas discharge portion through which the high pressure gas is discharged to one side in a left direction or a right direction of the vehicle may be formed at the inflator, and a shut-off flap, which changes a discharge direction of the high pressure gas to be directed toward the dead zone, may be formed at one side of the gas discharge portion.

The inflator may be installed in an airbag housing, the airbag cushion may be accommodated in the airbag housing in a folded state, a mounting jig, which mounts the inflator in the airbag housing, may be installed, and the shut-off flap, which changes a discharge direction of the high pressure gas to be directed toward the dead zone, may be formed on the mounting jig.

The shut-off flap may be formed as a shut-off wall that is vertically installed in an upright manner at a position that is spaced apart from a tip portion of the inflator at a predetermined distance in a horizontal direction.

The airbag cushion may be formed with a rear panel which is deployed to come into contact with a front surface of the wind shield glass, and a front panel which is sewn and coupled to an edge of the rear panel and absorbs impact of a pedestrian.

The dead zone may be formed in an arc shape or a semicircular shape that is convex downward.

When the gas discharge portion of the inflator is eccentrically positioned in one direction of the airbag cushion, the dead zone may be positioned at a position that is eccentrically disposed in the one direction.

The variable tether may include a horizontal portion which is extended in a horizontal direction, and inclined portions which are formed to be inclined upward from both ends of the horizontal portion so as to guide the high pressure gas passing through the at least two branch flow paths to the upper side of the airbag cushion.

The variable tether may be disposed in the airbag cushion in a state in which a portion having the plurality of vent holes is folded.

The plurality of vent holes may be formed to be spaced apart from each other in a length direction of the variable tether, and the variable tether may be folded along a folding line formed in the length direction.

The variable tether may have a temporarily joined line that is coupled with a temporarily sewn member in the length direction at a lower portion that is spaced apart from the plurality of vent holes at a predetermined distance so that at least partial portions of folded surfaces are in contact with each other.

The temporarily sewn member of the temporarily joined line may be loosened when internal pressure of the airbag cushion exceeds a preset value.

The variable tether may be formed in a sheet shape, and a front end portion of a sheet portion may be sewn on the front panel of the airbag cushion, and a rear end portion of the sheet portion may be sewn on the rear panel of the airbag cushion.

The airbag module for a vehicle according to the present invention may achieve the following effects.

The dead zone is formed in the airbag cushion so as to form at least two high pressure gas branch flow paths such that it is possible to omit a distribution chamber or a diffuser pocket and a reinforcing fabric in the related art, thereby reducing weight and costs.

The high pressure gas may quickly flow to the upper side of the airbag cushion by using the dead zone and the variable tether having the vent holes, thereby more stably protecting a pedestrian.

DETAILED DESCRIPTION

Hereinafter, an exemplary embodiment of an airbag module for a vehicle according to the present invention will be described in detail with reference to the accompanying drawings.

Figure 1:
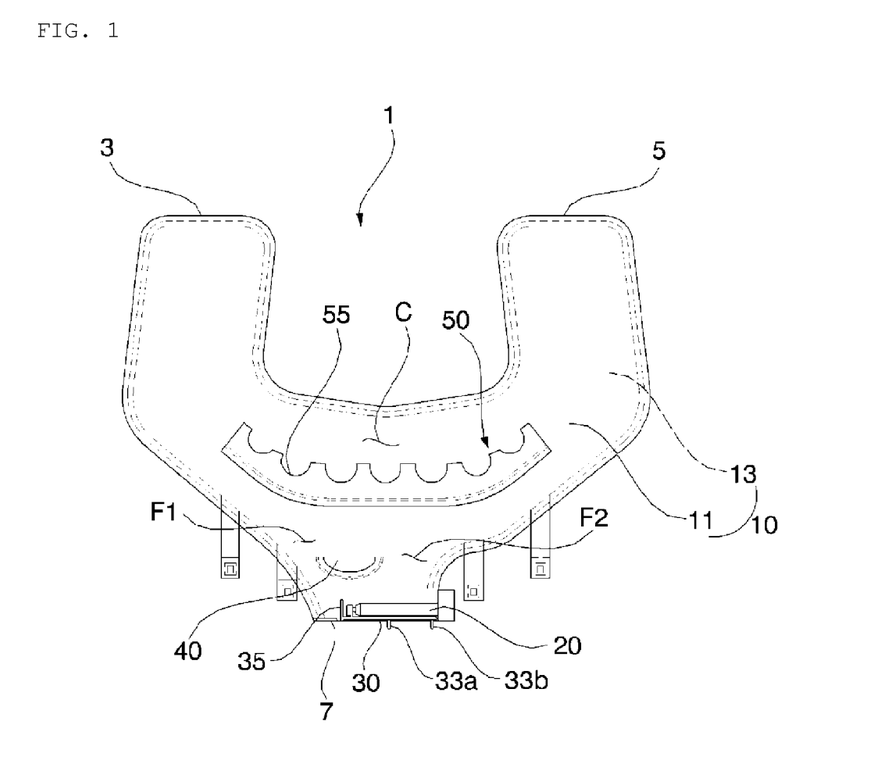
FIG. 1 is a top plan view illustrating an exemplary embodiment of an airbag module for a vehicle according to the present invention.

As illustrated in FIG. 1, an airbag module 1 for a vehicle according an exemplary embodiment of the present invention includes: an inflator 20 which is disposed below a front side of a wind shield glass (not illustrated); and an airbag cushion 10 which has high pressure gas branch flow paths F1 and F2 that branch off into at least two flow paths inside the airbag cushion 10, and is deployed toward the front side of the wind shield glass by high pressure gas supplied from the inflator 20.

In more detail, the airbag module 1 for a vehicle according to the present invention may be installed to be concealed inside a cowl top panel or a hood panel (not illustrated) of the configurations at the front side of the wind shield glass before a vehicle-pedestrian collision accident occurs. Particularly, the airbag module 1 for a vehicle according to the present invention may be disposed in a state in which the airbag module 1 is folded at an intermediate portion of a horizontal width of the vehicle.

Figure 2:
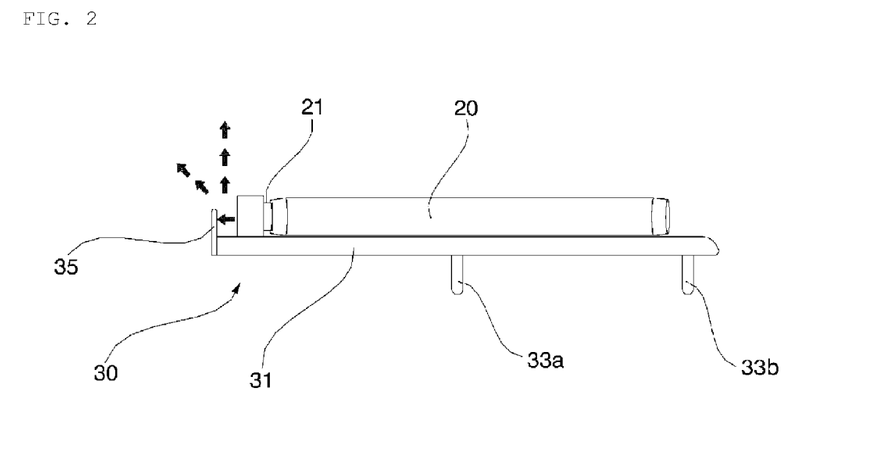
FIG. 2 is an enlarged view of an inflator of FIG. 1.

Meanwhile, as illustrated in FIG. 2, the inflator 20 is elongated in a left and right direction, and a gas discharge portion 21, through which compressed gas is discharged, is positioned at any one end of left and right ends thereof.

The compressed gas generated in the inflator 20 is discharged at a high speed toward one side of the inflator 20 through the gas discharge portion 21.

Because a length in the left and right direction of the inflator 20 is greater than roughly two-thirds of a width of a lower end portion 7 of the airbag cushion 10 that is deployed, it is difficult to vertically install the inflator 20 upward and downward inside the cowl top panel or the hood panel, and as a result, the inflator 20 is typically elongated in the left and right direction.

The gas discharge portion 21 of the inflator 20 may be eccentrically positioned at a position beyond a point that is two-thirds the width of the lower end portion 7 of the airbag cushion 10. In this case, the compressed gas discharged through the gas discharge portion 21 is inevitably and eccentrically discharged to one side of the lower end portion 7 of the airbag cushion 10, and as a result, there may be a problem in that internal pressure of the airbag cushion 10 cannot be uniform overall.

In the exemplary embodiment of the airbag module 1 for a vehicle according to the present invention, a shut-off flap 35, which changes a discharge direction of the compressed gas, is formed at one side of the gas discharge portion 21, thereby resolving the problem with the non-uniformity of the internal pressure of the airbag cushion 10.

In more detail, as illustrated in FIG. 1, the airbag cushion 10 of the airbag module 1 for a vehicle according to the present invention may further include: a dead zone 40 which is disposed above the inflator 20, and forms the branch flow paths F1 and F2 by joining and sewing predetermined portions of a front inner surface and a rear inner surface of the airbag cushion 10; and a variable tether 50 which is disposed above the branch flow paths F1 and F2, guides a flow of the compressed gas that flows while bypassing the dead zone 40, and opens a plurality of vent holes 55 which penetrates the airbag cushion 10 in an upward and downward direction when the pressure in the airbag cushion 10 exceeds a preset value.

The shut-off flap 35 may be formed to be spaced apart from the gas discharge portion 21, which is formed at a tip portion of the inflator 20, at a predetermined distance in a length direction of the inflator 20.

The shut-off flap 35 is disposed on a discharge path of the compressed gas that is discharged from the gas discharge portion 21, and serves to disperse the compressed gas so as to prevent the compressed gas from being discharged concentratedly to the one side of the airbag cushion 10, and change the discharge direction of the compressed gas to be directed toward an upper portion of the dead zone 40 or the wind shield glass.

However, it is not necessary to necessarily provide the shut-off flap 35 at the tip portion of the inflator 20, and as illustrated in FIG. 2, the shut-off flap 35 may be formed at a tip portion of a mounting jig 30 for mounting the inflator 20.

The mounting jig 30 may further include a coupling plate 31 to which the inflator 20 is coupled, and a plurality of leg portions 33a and 33b which is coupled to an airbag housing (not illustrated).

The airbag cushion 10 is accommodated in the airbag housing in a state in which the airbag cushion 10 is folded. As a method of folding the airbag cushion 10, a method of allowing the airbag cushion 10 to be most effectively deployed in consideration of a flow state and a flow speed of the compressed gas when the airbag cushion is expanded while the airbag cushion is filled with the compressed gas, and minimizing a volume occupied in the airbag housing may be adopted.

In the exemplary embodiment of the airbag module 1 for a vehicle according to the present invention, as illustrated in FIG. 1, the airbag cushion 10 may include a rear panel 13 which is deployed to come into contact with a front surface of the wind shield glass, and a front panel 11 which has an edge that is sewn and coupled together with the rear panel 13, and absorbs impact of the pedestrian.

Here, the dead zone 40 may be formed by joining and sewing parts of inner surfaces of the rear panel 13 and the front panel 11. Since the dead zone 40, which is formed as described above, as illustrated in FIG. 3, is a portion through which the compressed gas cannot pass, at least two branch flow paths F1 and F2, through which the compressed gas bypasses the dead zone 40 when the airbag cushion is filled with the compressed gas, are formed. The dead zone 40 is formed in an arc shape or a semi-circular shape, which is convex downward, so as to allow the high pressure gas to smoothly branch off into at least two branch flow paths F1 and F2.

Meanwhile, the airbag cushion 10 may be formed to be deployed in an approximate "U" shape as both left and right sides of the airbag cushion 10 protrude upward by the compressed gas passing through the two branch flow paths F1 and F2 formed at an intermediate portion of the lower end portion of the wind shield glass when the airbag cushion 10 is deployed while being filled with the compressed gas.

In this case, as described above, the inflator 20 is elongated in the left and right direction, the gas discharge portion 21 of the inflator 20 is eccentrically disposed at one side (the left side in the drawings) of the lower end portion 7 of the airbag cushion 10, and more particularly, the gas discharge portion 21 of the inflator 20 may be positioned at a position beyond a point that is two-thirds the length of the inflator 20 from one side of the lower end portion 7 of the airbag cushion 10 to the left side.

As such, the gas discharge portion 21 of the inflator 20 is positioned at one side of the lower end portion 7 of the airbag cushion 10 such that the compressed gas is discharged concentratedly toward one side of the airbag cushion 10, which may cause the internal pressure of the airbag cushion 10 to be non-uniform, and may greatly affect the overall deployment appearance of the airbag cushion 10. Therefore, by the shut-off flap 35, the compressed gas being discharged through the gas discharge portion 21 of the inflator 20 may be dispersed, and the discharge direction of the compressed gas may be changed. The shut-off flap 35 provides an advantage in that a diffuser pocket applied in the related art may be omitted.

However, when considering the overall deployment appearance of the airbag cushion 10, particularly, in order to maintain the internal pressure to be uniform at left and right upper portions 3 and 5 having a "U" shape as described in the present invention, and to allow the compressed gas to more quickly flow to the ends of the airbag cushion 10, an additional configuration is required in addition to the shut-off flap 35.

Figure 3:
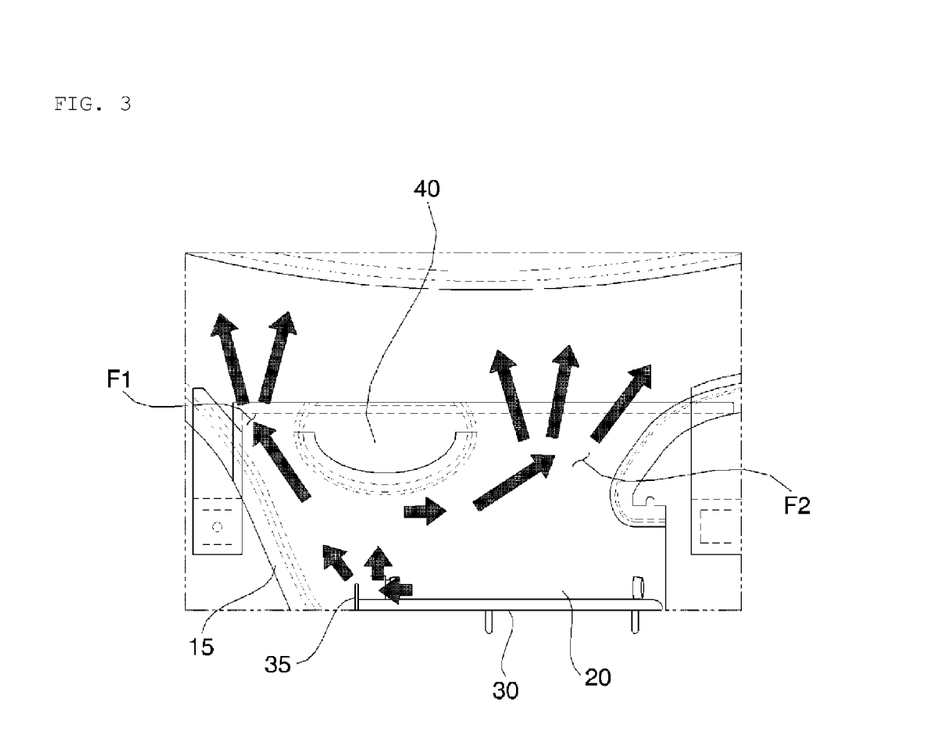
FIG. 3 is a view illustrating an initial state in which high pressure gas is supplied through branch flow paths in FIG. 1.

Therefore, as illustrated in FIG. 3, the dead zone 40 is disposed immediately above the gas discharge portion 21 of the inflator 20 in the airbag cushion 10 so that the flow of the compressed gas, which flows upward, branches off into at least two branch flow paths F1 and F2. Meanwhile, in FIG. 3, reference numeral 15 indicates a reinforcing fabric coupled to the lower portion of the airbag cushion, but the reinforcing fabric 15 may be omitted.

In a case in which the gas discharge portion 21 of the inflator 20 is eccentrically positioned at one side of the lower end portion 7 of the airbag cushion 10, the dead zone 40 may be positioned in the proximity of the branch flow path F1 so that a flow rate of compressed gas flowing through the branch flow path F1 adjacent to the gas discharge portion 21 is balanced with a flow rate of high pressure gas flowing though the branch flow path F2 that is positioned at the opposite side.

Figure 4:
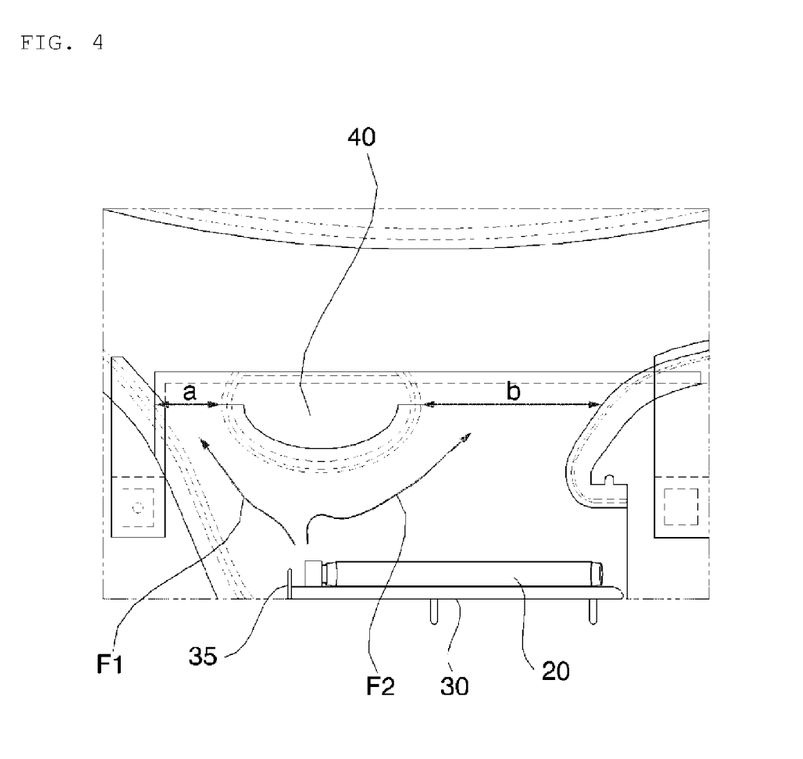
FIG. 4 is an enlarged view of a dead zone of FIG. 1.
Figure 5:
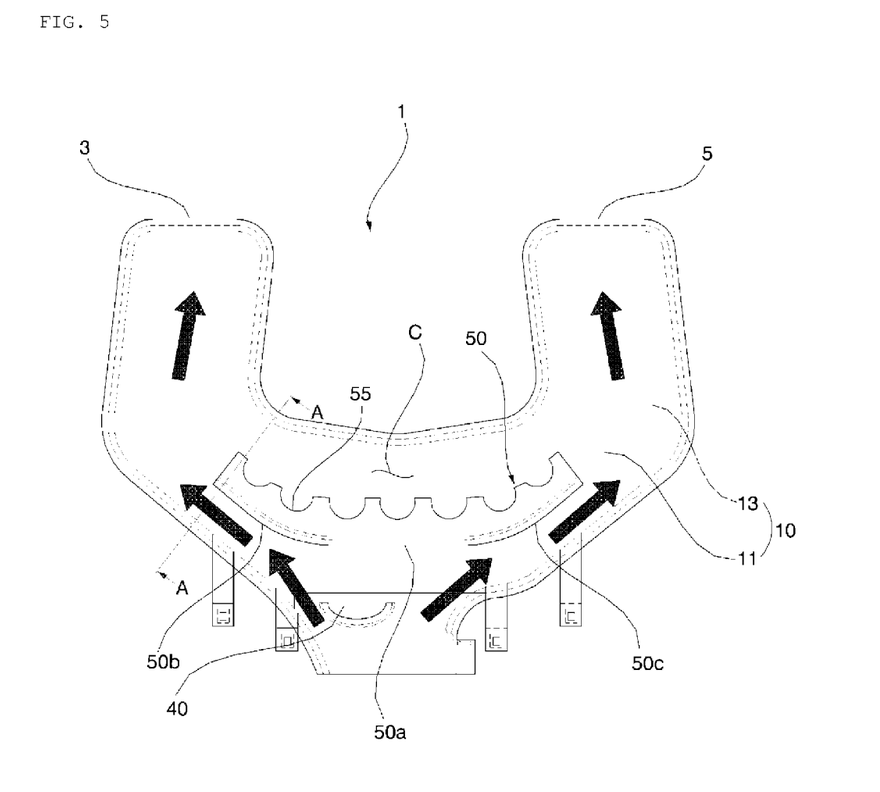
FIG. 5 is a view illustrating an intermediate state in which high pressure gas is supplied through the branch flow paths in FIG. 1.

That is, as illustrated in FIG. 4, assuming that the compressed gas being discharged through one side (the left side in FIG. 4) of the dead zone 40 has great pressure, the dead zone 40 is formed at a position where a horizontal distance a from a left end of the airbag cushion 10 is shorter than a horizontal distance b from a right end of the airbag cushion 10 such that the flow rates of the compressed gas being supplied to the left and right sides of the airbag cushion 10 are balanced.

Meanwhile, the variable tether 50 is positioned above the dead zone 40, and serves to guide high pressure gas, which branches off by the dead zone 40 and flows through at least two branch flow paths F1 and F2, so that the high pressure gas may smoothly flow up to the upper portions 3 and 5 at both sides of the airbag cushion 10.

In more detail, the variable tether 50 is formed in a sheet shape, and the sheet is formed to have a horizontal portion 50a which is extended in a horizontal direction (a left and right direction), and inclined portions 50b and 50c which are positioned to be inclined upward from both side portions of the horizontal portion 50a, and guide the compressed gas passing through the branch flow paths F1 and F2 to the upper side. In addition, the variable tether 50 has a front end portion 51 and a rear end portion 53 which are sewn and coupled to inner surfaces of the front panel 11 and the rear panel 13, respectively, and the plurality of vent holes 55, which is spaced apart from each other at a predetermined distance in the left and right direction, is formed at a central portion 52 between the front end portion 51 and the rear end portion 53.

The variable tether 50 is positioned above the dead zone 40, guides the compressed gas passing through the two branch flow paths F1 and F2 to the upper side, and blocks the compressed gas from passing through the central portion in an upward direction, before the internal pressure of the airbag cushion 10 reaches a preset value while the airbag cushion 10 is filled with the compressed gas although it is a short time.

Figure 6A:
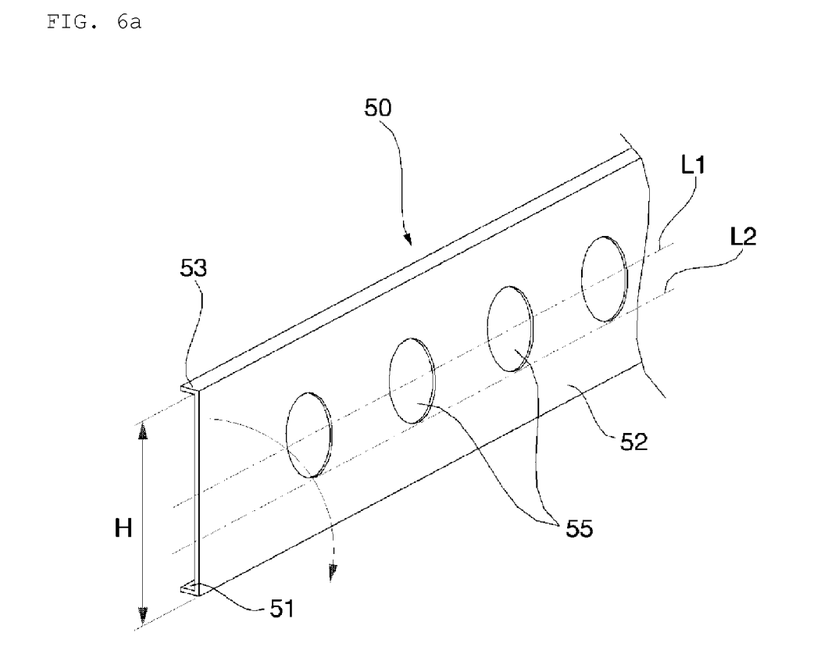
FIGS. 6A to 6C are views illustrating states in which a variable tether of FIG. 1 is folded and sewn.
Figure 6B:
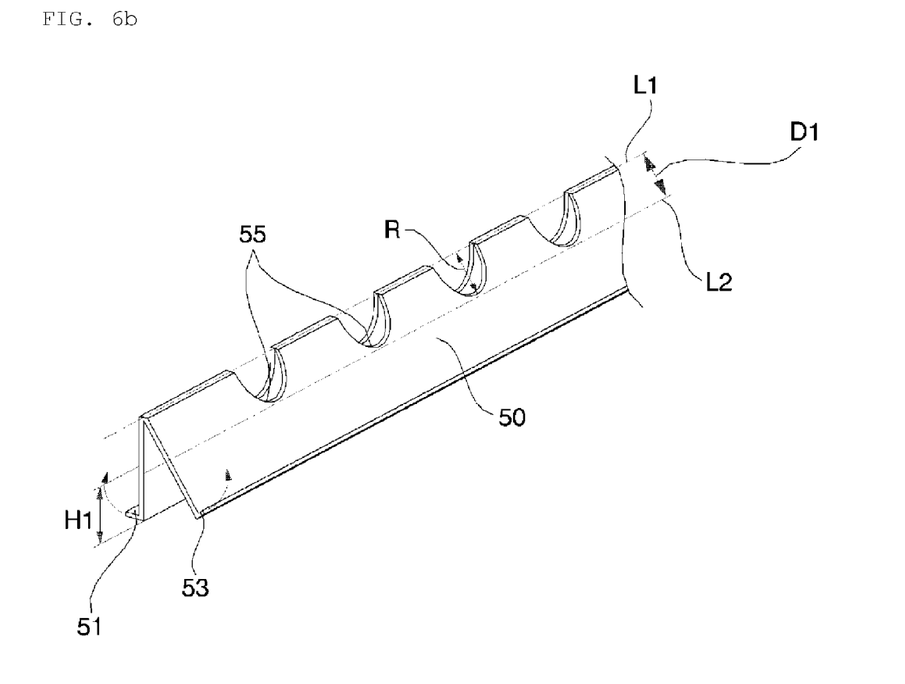
Figure 6C:
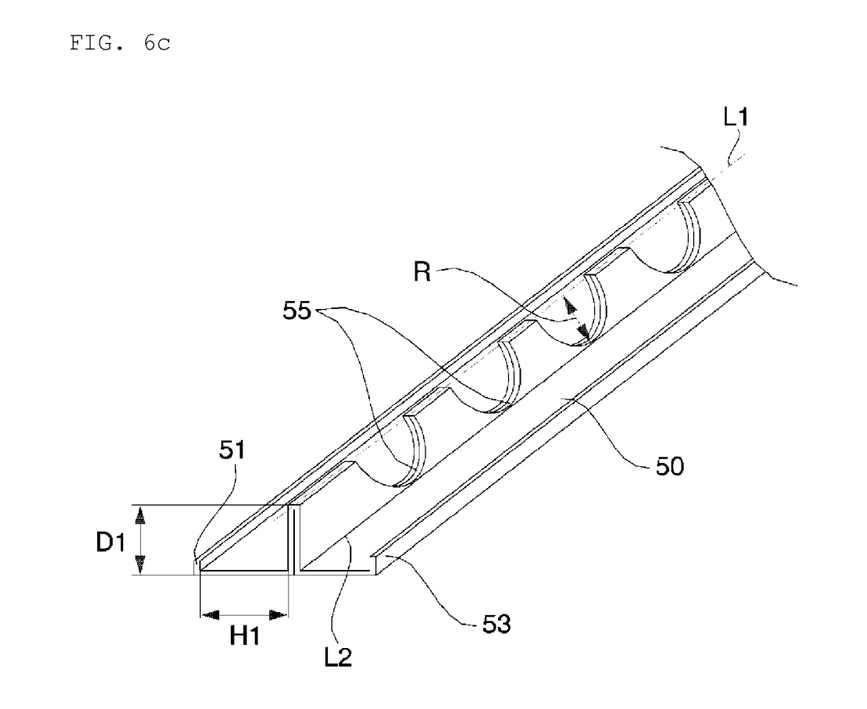
Figure 7:
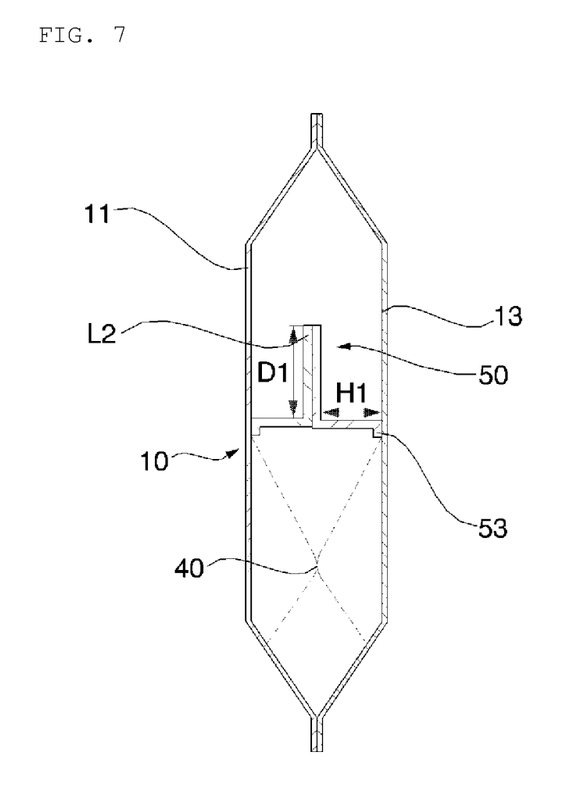
FIG. 7 is a cross-sectional view illustrating the variable tether of FIG. 1.
Figure 8:
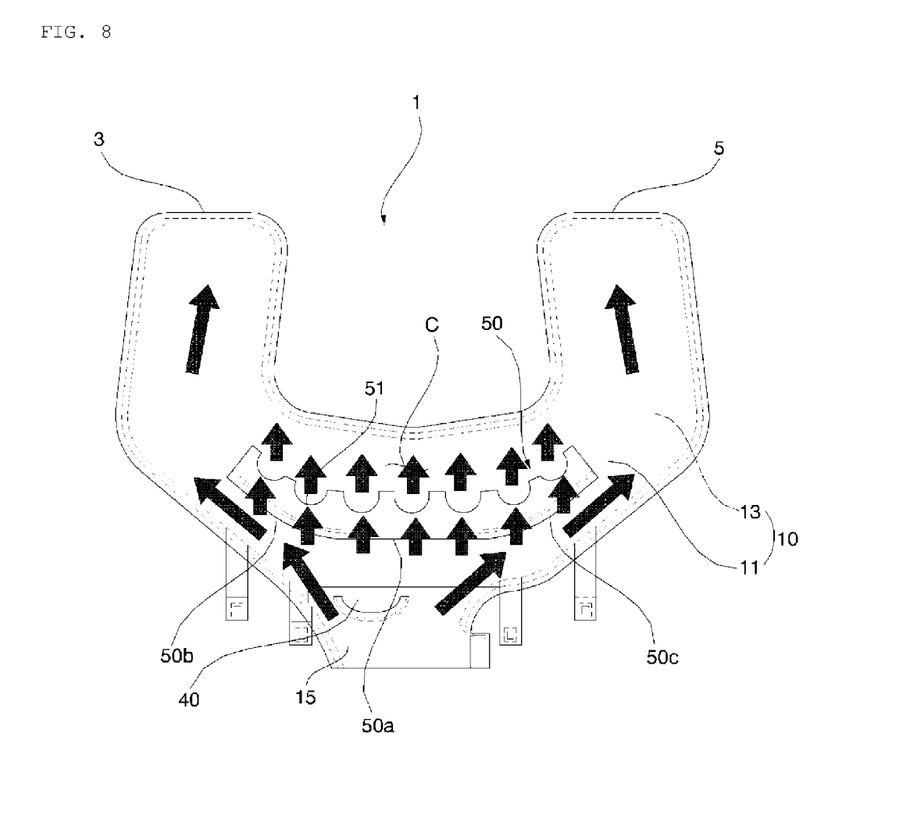
FIG. 8 is a view illustrating an operational state of FIG. 1.

As illustrated in FIGS. 6A to 6C, when the airbag cushion 10 is accommodated in the airbag housing in a folded state, the variable tether 50 may be disposed in the airbag cushion 10 in a folded state. In more detail, the folding line L1 is formed to cross the plurality of vent holes 55 so that the plurality of vent holes 55 is closed when the variable tether 50 is folded along the folding line (a line along which the variable tether 50 is folded) L1, and the variable tether 50 may be positioned in the airbag cushion 10 in a state in which the variable tether 50 is folded along the folding line L1.

Meanwhile, the variable tether 50 may have a temporarily joined line L2 which is coupled with a temporarily sewn member to a portion, which is spaced apart downward from the plurality of vent holes 55 at a predetermined distance, in a horizontal direction so that folded surfaces are joined while facing each other.

Here, when the internal pressure of the airbag cushion 10 exceeds a preset value and the airbag cushion 10 is deployed to a predetermined size or more when the airbag cushion 10 is deployed by the compressed gas, the variable tether 50 is spread in forward and rearward directions, the plurality of vent holes 55 is opened to penetrate the variable tether 50 upward and downward, and the compressed gas flows upward through the plurality of vent holes 55. In this case, in a case in which the internal pressure of the airbag cushion 10 exceeds a preset value, the temporarily joined line L2 is loosened such that the plurality of vent holes 55 is opened.

That is, in a case in which the internal pressure of the airbag cushion 10 is a preset value or less, the temporarily joined line L2 is maintained not to be loosened such that the variable tether 50 serves to guide the high pressure gas so that the high pressure gas quickly flows through the two high pressure gas branch flow paths F1 and F2, and in a case in which the internal pressure of the airbag cushion 10 exceeds a preset value, the temporarily joined line L2 is loosened such that the variable tether 50 serves to maintain overall front and rear thicknesses of the airbag cushion 10, and allow the high pressure gas to flow even to a central portion C of the airbag cushion 10 through the plurality of vent holes 55 such that the airbag cushion 10 may be overall uniformly filled with the high pressure gas.

As illustrated in FIG. 6A, the variable tether 50 is elongated in the left and right direction so that a width of the central portion 52 in a forward and rearward direction becomes "H" when the airbag cushion 10 is deployed, and has the front end portion 51 and the rear end portion 53 that are sewn and coupled to the inner surfaces of the front panel 11 and the rear panel 13, respectively.

Meanwhile, a distance from the inner surfaces of the front panel 11 and the rear panel 13 to the temporarily joined line L2 may be defined by "H1", and a separation distance between the temporarily joined line L2 and the folding line L1 may be defined by "D1". Here, "D1" may be greater than a radius R of the plurality of vent holes 55. "D1" merely refers to a maximum separation distance between the temporarily joined line L2 and the folding line L1, and the variable tether 50 may be temporarily joined by a temporarily sewn member at any portion corresponding to D1.

Here, coupling force of the temporarily sewn member may be determined in consideration of the aforementioned set value of internal pressure of the airbag cushion 10, and as a temporarily sewn means, a sewing method or an adhesive may be selected.

When the internal pressure of the airbag cushion 10 is a preset value or less, the front and rear thicknesses of the airbag cushion 10 become H1*2 as the airbag cushion 10 is filled with the compressed gas (as long as a thickness of a portion formed by the temporarily joined line L2 is small enough not to effect thereof), and when the internal pressure of the airbag cushion 10 exceeds a preset value, the temporarily joined line L2 of the variable tether 50 is loosened, the airbag cushion is expanded so that the front and rear thicknesses thereof become H, the plurality of vent holes 55 is opened, and the compressed gas flows from a lower side to an upper side through the plurality of vent holes 55, and as a result, the airbag cushion 10 may be uniformly filled with the compressed gas even at the central portion C thereof.

Therefore, when the airbag cushion 10 is finally deployed, a thickness of a portion of the variable tether 50 becomes 2H1+2D1=H.

When the variable tether 50 is coupled in the airbag cushion 10, the variable tether 50 is folded once along the folding line L1 as illustrated in FIG. 6A, portions folded along the temporarily joined line L2 are coupled by a temporarily sewn member as illustrated in FIGS. 6B and 6C, and thereafter, the front end portion 51 and the rear end portion 53 are sewn and coupled to the inner surfaces of the airbag cushion 10, respectively.

An operational process of the airbag module 1 for a vehicle for protecting a pedestrian according to the present invention, which is configured as described above, will be described below.

First, when the inflator 20 is operated by a vehicle-pedestrian collision accident when the vehicle travels, the compressed gas is discharged at a high speed through the gas discharge portion 21 of the inflator 20.

In this case, discharge pressure of the compressed gas is dispersed by the shut-off flap 35, and a discharge direction of the compressed gas is changed to be directed upward.

The high pressure compressed gas being discharged upward is distributed by the dead zone 40 through the two branch flow paths F1 and F2.

When the internal pressure of the airbag cushion 10 is a preset value or less, the compressed gas, which branches off through the two branch flow paths F1 and F2, quickly flows to the left and right upper portions 3 and 5 of the airbag cushion 10 while being guided by the inclined portions 50b and 50c of the variable tether 50 such that the airbag cushion 10 is filled with the compressed gas, and when the internal pressure of the airbag cushion 10 exceeds a preset value, the temporarily joined line L2 of the variable tether 50 is loosened, the plurality of vent holes 55 is opened, and the compressed gas is supplied to the central portion C of the airbag cushion 10 through the plurality of vent holes 55, such that the airbag cushion 10 may be overall quickly and uniformly filled with the high pressure gas.

According to the airbag module 1 for a vehicle according to the present invention, which is configured as described above, it is possible to omit a separate distribution chamber or diffuser pocket for dispersing eccentric discharge pressure of the compressed gas or changing a direction, and omit a reinforcing fabric accordingly, thereby reducing weight and costs. Meanwhile, the upper portions 3 and 5 at both left and right sides of the airbag cushion 10 may be quickly filled with the high pressure gas, thereby more stably protecting a pedestrian.

As described above, the preferred exemplary embodiment of the airbag module for a vehicle for protecting a pedestrian according to the present invention has been described in detail with reference to the accompanying drawings. However, the exemplary embodiment of the present invention is not necessarily limited by the aforementioned preferred exemplary embodiment, and it would be appreciated that various modifications and equivalent exemplary embodiments may be made by those skilled in the art. Accordingly, it should be understood that the true scope of the present invention shall be defined by the claims to be disclosed below.

What is claimed is:

1. An airbag module for a vehicle, comprising:
an inflator having a gas discharge portion which discharges high pressure gas and an opposite end positioned opposite to the gas discharge portion; and
an airbag cushion which is deployed by the high pressure gas discharged from the inflator,
wherein the airbag cushion includes a dead zone which branches off the high pressure gas discharged from the inflator to flow through at least two branch flow paths, wherein the at least two branch flow paths includes:
a first branch flow path disposed adjacent to the gas discharge portion; and
a second branch flow path disposed adjacent to the opposite end and wider than the first branch flow path.

2. The airbag module of claim 1, wherein the dead zone is formed by joining a predetermined portion of an inner surface of a front panel of the airbag cushion to a predetermined portion of an inner surface of a rear panel.

3. The airbag module of claim 2, wherein the dead zone is formed by joining predetermined portions of the front panel and the rear panel by a sewing means.

4. The airbag module of claim 1, wherein the gas discharge portion discharges the high pressure gas to one side in a left direction or a right direction of the vehicle, and
wherein a shut-off flap, which changes a discharge direction of the high pressure gas to be directed toward an upper portion where the dead zone is formed, is formed at one side of the gas discharge portion.

5. The airbag module of claim 1, further comprising:
a mounting jig on which the inflator is mounted,
wherein the gas discharge portion discharges the high pressure gas to one side in a left direction or a right direction of the vehicle is formed at the inflator, and
wherein a shut-off flap, which changes a discharge direction of the high pressure gas to be directed toward an upper portion where the dead zone is formed, is formed on the mounting jig.

6. The airbag module of claim 4, wherein the shut-off flap is formed as a shut-off wall that is vertically installed in an upright manner at a position that is spaced apart from a tip portion of the inflator at a predetermined distance in a horizontal direction.

7. The airbag module of claim 1, wherein the dead zone is formed in an arc shape or a semi-circular shape that is convex toward the gas discharge portion.

8. The airbag module of claim 1, wherein when the gas discharge portion of the inflator is eccentrically positioned in one direction of the airbag cushion, the dead zone is eccentrically positioned in a direction toward one side where the gas discharge portion is eccentrically disposed.

9. The airbag module of claim 1, wherein a variable tether, which guides the high pressure gas passing through the first branch flow path to a first end of the airbag cushion positioned at an upper portion of the airbag cushion and guides the high pressure gas passing through the second branch flow path to a second end of the airbag cushion positioned at the upper portion of the airbag cushion, wherein the variable tether has a plurality of vent holes that is opened so that upper and lower portions of the airbag cushion communicate with each other when internal pressure of the airbag cushion exceeds a preset value, is installed in the airbag cushion.

10. The airbag module of claim 9, wherein the variable tether includes a horizontal portion which is extended in a horizontal direction, and inclined portions which are formed to be inclined upward from both ends of the horizontal portion so as to guide the high pressure gas passing through the at least two branch flow paths to the upper side of the airbag cushion.

11. The airbag module of claim 9, wherein the variable tether is disposed in the airbag cushion in a state in which a portion having the plurality of vent holes is folded.

12. The airbag module of claim 11, wherein the plurality of vent holes is formed to be spaced apart from each other in a length direction of the variable tether, and the variable tether is folded along a folding line in the length direction.

13. The airbag module of claim 12, wherein the variable tether has a temporarily joined line that is coupled with a temporarily sewn member in the length direction at a lower portion that is spaced apart from the plurality of vent holes at a predetermined distance so that at least partial portions of folded surfaces are in contact with each other.

14. The airbag module of claim 13, wherein the temporarily joined line is loosened when internal pressure of the airbag cushion exceeds a preset value.

15. The airbag module of claim 9, wherein the variable tether is formed in a sheet shape, and a front end portion of a sheet portion is sewn on the front panel of the airbag cushion, and a rear end portion of the sheet portion is sewn on the rear panel of the airbag cushion.

16. An airbag module for a vehicle, comprising:
an inflator having a gas discharge portion which discharges high pressure gas and an opposite end positioned opposite to the gas discharge portion; and
an airbag cushion which is deployed by the high pressure gas discharged from the inflator,
wherein the airbag cushion includes:
a neck portion in which the inflator is positioned;
an expansion portion expanded from the neck portion;
branched portions each extended from the expansion portion;
a dead zone disposed at a portion where the neck portion and the expansion portion is connected, wherein the dead zone branches off the high pressure gas discharged from the inflator to flow through at least two branch flow paths, wherein the at least two branch flow paths includes:
a first branch flow path disposed adjacent to the gas discharge portion, and
a second branch flow path disposed adjacent to the opposite end and wider than the first branch flow path; and
a variable tether disposed in the expansion portion and guiding the high pressure gas passing through the first branch flow path to one of the branched portions and the high pressure gas passing through the second branch flow path to another branched portion, wherein the variable tether is expanded when internal pressure of the airbag cushion exceeds a preset value.

17. The airbag module of claim 16, further comprising a shut-off flap positioned adjacent to the gas discharge portion and which directs the high pressure gas discharged from the gas discharge portion toward the dead zone.

18. The airbag module of claim 16, wherein the dead zone is formed in an arc shape or a semi-circular shape that is convex toward the gas discharge portion.

19. The airbag module of claim 16, wherein the variable tether includes a plurality of vent holes that is opened when the internal pressure of the airbag cushion exceeds the preset value so that upper and lower portions of the airbag cushion communicate with each other.

* * * * *